(12) United States Patent
Mensch et al.

(10) Patent No.: US 10,274,622 B2
(45) Date of Patent: Apr. 30, 2019

(54) ACQUISITION SYSTEM AND METHOD FOR BLENDED SEISMIC DATA

(71) Applicant: CGG SERVICES SA, Massy (FR)

(72) Inventors: Thomas Mensch, Paris (FR); Helene Tonchia, Antony (FR); Gordon Poole, East Grinstead (GB)

(73) Assignee: CGG SERVICES SAS, Massy (FR)

( * ) Notice: Subject to any disclaimer, the term of this patent is extended or adjusted under 35 U.S.C. 154(b) by 367 days.

(21) Appl. No.: 14/243,851

(22) Filed: Apr. 2, 2014

(65) Prior Publication Data

US 2014/0301162 A1    Oct. 9, 2014

Related U.S. Application Data

(60) Provisional application No. 61/807,959, filed on Apr. 3, 2013, provisional application No. 61/942,961, filed on Feb. 21, 2014.

(51) Int. Cl.
*G01V 1/24* (2006.01)
*G01V 1/00* (2006.01)
*G01V 1/36* (2006.01)
*G01V 1/38* (2006.01)

(52) U.S. Cl.
CPC .......... *G01V 1/24* (2013.01); *G01V 1/003* (2013.01); *G01V 1/364* (2013.01); *G01V 1/38* (2013.01); *G01V 2210/127* (2013.01); *G01V 2210/57* (2013.01)

(58) Field of Classification Search
CPC .......... G01V 1/24; G01V 1/003; G01V 1/364; G01V 1/38; G01V 2210/57; G01V 2210/127

USPC ..................................................... 367/23, 15
See application file for complete search history.

(56) References Cited

U.S. PATENT DOCUMENTS

| 4,953,657 | A | 9/1990 | Edington |
| 5,924,049 | A * | 7/1999 | Beasley ............... G01V 1/003 367/56 |
| 6,545,944 | B2 | 4/2003 | de Kok |
| 8,295,124 | B2 | 10/2012 | Abma |
| 8,395,966 | B2 | 3/2013 | Moore et al. |

(Continued)

OTHER PUBLICATIONS

Extended Search Report in corresponding European Application No. 14 16 2865 dated Sep. 7, 2015.

(Continued)

*Primary Examiner* — Daniel L Murphy
(74) *Attorney, Agent, or Firm* — Patent Portfolio Builders PLLC

(57) ABSTRACT

System, medium and method for de-blending seismic data. The method for acquiring blended seismic data associated with a subsurface of the earth includes receiving coordinates of a sail line associated with first and second shot point locations; towing first and second source arrays in water along the sail line; shooting the first and second source arrays with a constant delay parameter so that a seismic trace recorded by a seismic sensor has at least a first uncontaminated portion that includes seismic energy generated substantially only by one of the first and second source arrays and a second portion that includes seismic energy generated by both the first and second source arrays; and recording blended seismic data generated by the first and second source arrays with the seismic sensor.

15 Claims, 17 Drawing Sheets

(56) References Cited

U.S. PATENT DOCUMENTS

| | | | |
|---|---|---|---|
| 2010/0271904 A1 | 10/2010 | Moore et al. | |
| 2012/0147701 A1* | 6/2012 | Ross | G01V 1/005 367/23 |
| 2012/0176861 A1 | 7/2012 | Abma et al. | |
| 2013/0121109 A1 | 5/2013 | Baardman et al. | |
| 2013/0121110 A1* | 5/2013 | Trad | G01V 1/364 367/63 |
| 2013/0286777 A1 | 10/2013 | Frijlink | |
| 2014/0303898 A1 | 10/2014 | Poole | |

OTHER PUBLICATIONS

Extended Search Report in corresponding European Application No. 14 16 2026 dated Sep. 7, 2015.

Herrmann et al., "Curvelet-based non-linear adaptive subtraction with sparseness constraints", SEG International Exposition and 74th Annual Meeting, Oct. 10-15, 2004, Denver, Colorado.

Moore et al., "Simultaneous source separation using dithered sources", SEG Annual Meeting, Nov. 9-14, 2008, Las Vegas, Nevada.

Trad et al., "Latest views of the sparse Radon transform", Geophysics, Jan.-Feb. 2003, pp. 386-399, vol. 68, No. 1.

Abma et al., V002 "Separating simultaneous sources by inversion," 71st EAGE Conference & Exhibition, Amsterdam, The Netherlands, Jun. 8-11, 2009.

Hampson et al., Special Section: Seismic Acquisition, "Acquisition using simultaneous sources," Leading Edge, vol. 27, No. 7, Jul. 2008, pp. 918-923.

Stefani et al., B006 "Acquisition using simultaneous sources," 69th EAGE Conference & Exhibition, London, UK, Jun. 11-14, 2007.

Examination Report No. 1 in corresponding Australian Patent Application No. 2014201876 dated Sep. 27, 2017.

Office Action, dated Jun. 12, 2018, from corresponding U.S. Appl. No. 14/225,488.

European Office Action, dated Sep. 13, 2018, for related European Application No. 14162865.1.

Office Action, dated Jan. 7, 2019, from corresponding U.S. Appl. No. 14/225,488. (References not cited herewith have been previously made of record).

* cited by examiner

Fig. 1A
Fig. 1B
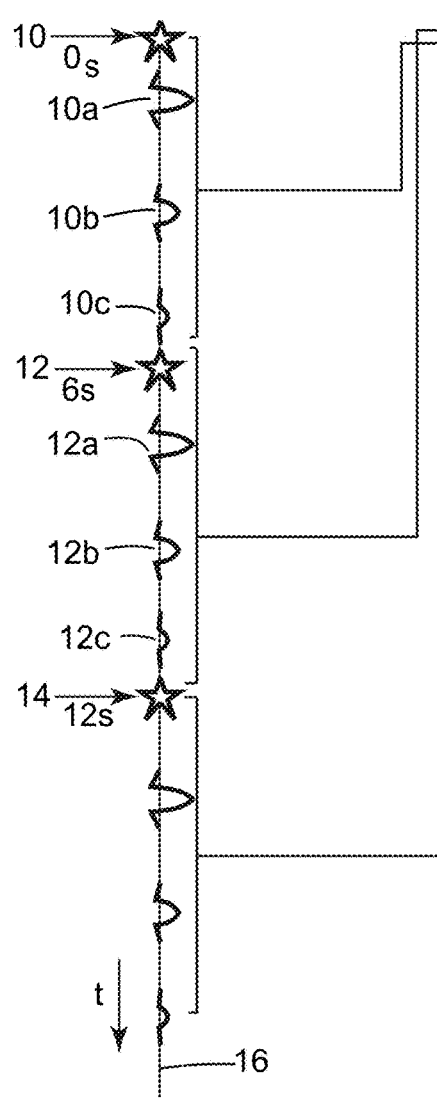
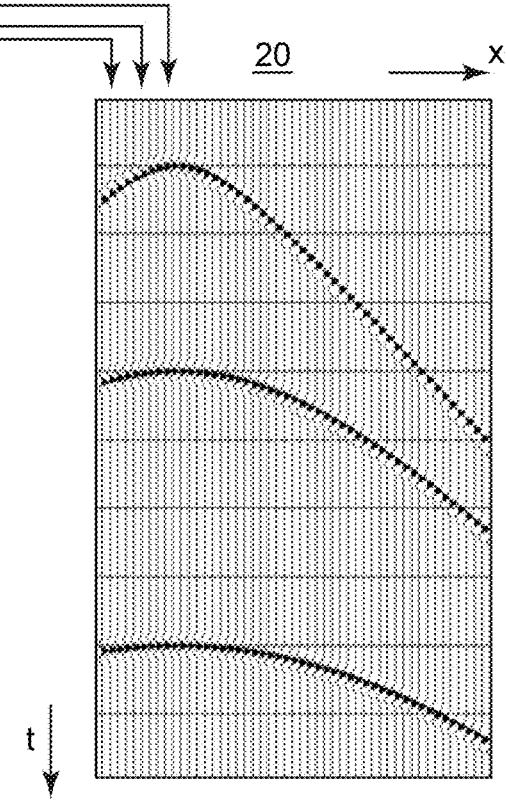

Fig. 2A
Fig. 2B
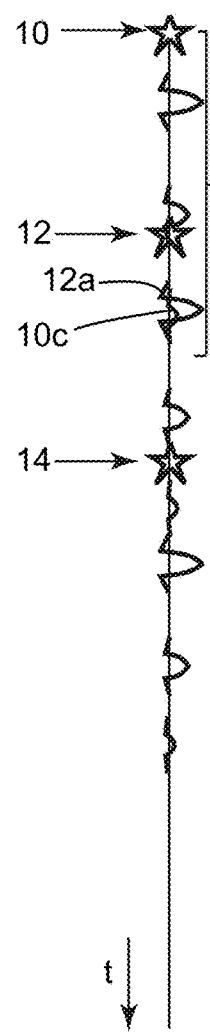
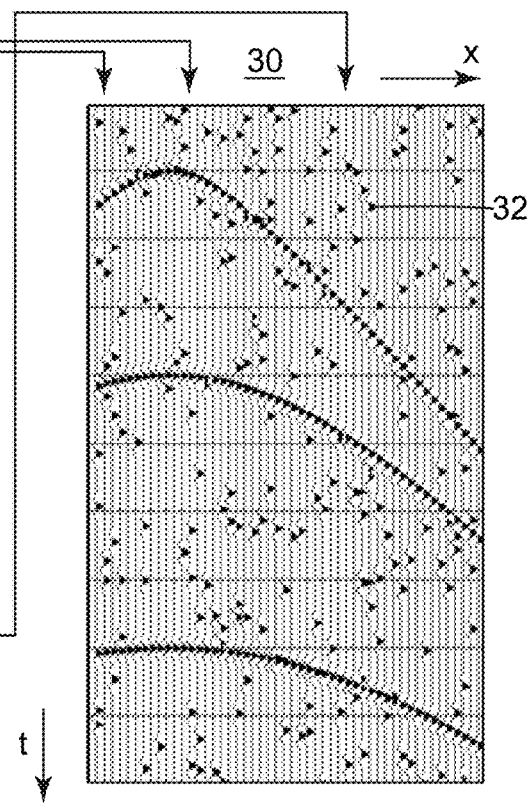

ACQUISITION SYSTEM AND METHOD FOR BLENDED SEISMIC DATA

CROSS REFERENCE TO RELATED APPLICATIONS

The present application claims the benefit of priority under 35 U.S.C. § 119(e) to U.S. Provisional Application No. 61/942,961, filed on Feb. 21, 2014, and U.S. Provisional Application No. 61/807,959, filed on Apr. 3, 2013. The entire contents of the above documents are hereby incorporated by reference into the present application.

BACKGROUND

Technical Field

Embodiments of the subject matter disclosed herein generally relate to methods and systems for acquiring blended seismic data and, more particularly, to mechanisms and techniques for generating seismic energy in a blended manner during an acquisition seismic survey.

Discussion of the Background

Seismic data acquisition and processing may be used to generate a profile (image) of geophysical structures under the ground (subsurface). While this profile does not provide an accurate location for oil and gas reservoirs, it suggests, to those trained in the field, the presence or absence of such reservoirs. Thus, providing a high-resolution image of the subsurface is important, for example, to those who need to determine where oil and gas reservoirs are located.

In traditional marine seismic acquisition, a vessel tows plural streamers having multiple seismic receivers configured to record seismic data. The vessel also tows a seismic source that imparts energy into the water. The seismic energy travels toward the subsurface and is partially reflected back to the sea surface. Seismic recorders record the reflected seismic waves.

When the source (either land source or marine source) is fired in standard data acquisition, the subsequent recording time is defined so that all useful reflected/diffracted energy is recorded before the next source is fired. This delay time imposes constraints on the acquisition rate and, hence, increases the cost of acquisition.

To reduce acquisition time, it is possible to simultaneously shoot sources. The term "simultaneously" should be loosely interpreted in this description, i.e., if first and second sources are considered, the second source may fire seconds after the first source was fired, and the shooting is still considered to be simultaneous as long as energy generated by the first source and energy generated by the second source and reflected by the subsurface are simultaneously recorded by the seismic receivers. In other words, the term "simultaneous" encompasses the case in which the second source fires during the listening time corresponding to the first source. From the seismic receivers' point of view, acquisition of simultaneous source data means that the signals from two or more sources interfere during at least part of a given listening time. By acquiring data in this way, with two or more vessels, time taken to shoot a dataset is reduced, along with acquisition costs. As an alternative to reducing acquisition time, a higher density dataset may be acquired in the same time. For such data to be useful, it is necessary to develop processing algorithms to handle source interference (cross-talk noise).

Source interference appears because subsurface reflections from an early source excitation may be comingled with those that have been sourced later, i.e., a "blended source" survey is acquired. Note that this is in contrast to conventional non-blending surveying techniques, wherein the returning subsurface reflections from one source are not allowed to overlap with the reflections of another source. Although the blended-source approach has the potential to reduce time in the field, thereby proportionally reducing survey cost, one problem is that it can be difficult to separate the individual shots thereafter, which is necessary in the processing stage. In other words, what is needed in interpreting seismic data is the depth of each reflector, and the depth of a reflector is determined by reference to its two-way seismic travel time as generated by a single source. Thus, in a multiple-source survey, the goal is to determine which of the observed subsurface reflections is associated with each source, i.e., to de-blend the data; otherwise, the two-wave travel time cannot be reliably determined.

In this regard, FIG. 1A shows sources being actuated at different spatial positions 10, 12 and 14 with time delays such that the recorded wavelets 10*a-c* corresponding to spatial position 10 do not interfere (in time) with wavelets 12*a-c* corresponding to spatial position 12. The signal recorded at the receiver can be considered a single continuous recording/trace (16). Alternatively, single trace 16 may be divided into plural traces, based on the listening time associated with each shot point 10, 12 and 14. In this way, continuous trace 16 is split into regular seismic traces for each individual shot as shown in FIG. 1B. Traces illustrated in FIG. 1B form a receiver gather 20. Each trace in receiver gather 20 relates to a different shot, i.e., has a given location in the field, which is illustrated by having different values on axis X (m), and each wavelet has a different time on a temporal axis t (s).

FIG. 2A shows a similar source configuration, but now the sources are simultaneously activated so that, for example, wavelet 10*c* might be superimposed (in time) over wavelet 12*a*, resulting in blended data. FIG. 2B shows the receiver gather 30 formed though pseudo-de-blending. Pseudo-de-blending involves forming regular seismic traces from continuous recording based on the start time of each shot's actuation, with no attempt to mitigate cross-talk noise. The data of FIG. 2B has been shot in less time than the data in FIG. 1B, but cross-talk 32 is observed, and noise on one trace is signal on another trace.

Thus, for gather 30 in FIG. 2B, it is necessary to separate the energy associated with each source (de-blend) as a preprocessing step, and then to proceed with conventional processing. To make separation easier, it is generally advantageous to use a variety of different source signals, for example, different vibroseis sweeps or pseudo-random sweeps for land acquisition. When energy from a given source is correlated with the sweep signal, this allows a designature operator to be applied on the acquired seismic data, which results in focusing the energy of that source while keeping energy from other sources dispersed. The actual timing of the shots may also be used to successfully de-blend the energy from the sources.

To acquire the seismic data illustrated in FIGS. 1A-B, the 3-dimensional (3D) seismic data acquisition system 300 illustrated in FIG. 3A may be used (note that streamers and corresponding seismic sensors are not shown in FIG. 3A for simplicity). The system includes a vessel 302 that tows a pair of source arrays 304 and 306. Source arrays 304 and 306 are alternately activated along corresponding source lines 304A and 306A with a shot point interval d so that source array 304 is activated at odd shot point locations 1001, 1003, etc., and source array 306 is activated at even shot point locations 1002, 1004, etc. Symbols S1 and S2 are used throughout the specification to illustrate the positions of the source arrays when shot. FIG. 3B shows a temporal view of the source arrays' activations in this traditional seismic acquisition system. Note that the acquired seismic data is not blended because the shot point interval d is large enough to allow energy from a previous shot to die down before the next shot.

A new acquisition system that shoots blended data, as illustrated in FIGS. 2A-B, for reducing the acquisition time, is desired and now discussed.

SUMMARY OF THE INVENTION

According to an embodiment, there is method for acquiring blended seismic data associated with a subsurface of the earth. The method includes receiving coordinates of a sail line associated with first and second shot point locations; towing first and second source arrays in water along the sail line; shooting the first and second source arrays with a constant delay parameter so that a seismic trace recorded by a seismic sensor has at least a first uncontaminated portion that includes seismic energy generated substantially only by one of the first and second source arrays and a second portion that includes seismic energy generated by both the first and second source arrays; and recording blended seismic data generated by the first and second source arrays with the seismic sensor.

According to another embodiment, there is a method for acquiring blended seismic data associated with a subsurface of the earth. The method includes receiving the coordinates of a sail line associated with first and second shot point locations; towing first and second source arrays in water along the sail line; shooting the first and second source arrays with first and second delay parameters, respectively, relative to the first shot point location; shooting the first and second source arrays with reverse delay parameters relative to the second shot point location; and recording blended seismic data generated by the first and second source arrays with seismic receivers towed along a streamer.

According to still another embodiment, there is a method for acquiring blended seismic data associated with a subsurface of the earth. The method includes receiving information about two sail lines associated with first and second shot point locations; towing first to fourth source arrays in water along the sail lines, two of the source arrays following one of the sail lines and the other two of the source arrays following the other one of the sail lines; shooting two of the first to fourth source arrays with constant first and second delay parameters, respectively, relative to the first shot point location; shooting two other of the first to fourth source arrays with reverse delay parameters relative to the second shot point location; and recording blended seismic data generated by the first to fourth source arrays with seismic receivers towed along a streamer.

According to yet another embodiment, there is a system for acquiring blended seismic data associated with a subsurface of the earth. The system includes a controller configured to receive coordinates of a sail line associated with first and second shot point locations; and first and second source arrays configured to be towed in water along the sail line. The controller is configured to shoot the first and second source arrays with a constant delay parameter so that a seismic trace recorded by a seismic sensor has at least a first uncontaminated portion that includes seismic energy generated substantially only by one of the first and second source arrays and a second portion that includes seismic energy generated by both the first and second source arrays. The blended seismic data generated by the first and second source arrays is recorded with the seismic sensor.

BRIEF DESCRIPTION OF THE DRAWINGS

For a more complete understanding of the present invention, reference is now made to the following descriptions taken in conjunction with the accompanying drawings, in which:

FIGS. 1A-B are graphical illustrations of un-blended seismic data;

FIGS. 2A-B are graphical illustrations of blended seismic data;

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a marine seismic system having two seismic sources. However, the embodiments to be discussed next are not limited to a marine seismic system with two sources, but may also be applied to a land seismic system, a marine system with multiple source arrays, or an ocean bottom system (OBS) with many source arrays.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is seismic acquisition system that uses two or more source arrays that are simultaneously shot with a constant time delay relative to pre-planned shot point locations so that, for one shot point, a recorded trace corresponding to one of the source arrays has a portion free of energy generated by the other source arrays and, thus, a novel de-blending algorithm can be applied, as disclosed for example, in U.S. patent Ser. No. 14/225,488 filed on Mar. 26, 2014, the entire content of which is incorporated herein. In one application, for each shot point location there is at least one recorded trace corresponding to a given source array that has a starting portion substantially free of contamination from all the other source arrays. The term substantially is used herein to indicate that some residual energy from a previous shot may still be present, but it will be very weak compared to the new shot firing. However, no energy from other sources, for the new shot firing, should be present in the starting portion.

Figure 3A:
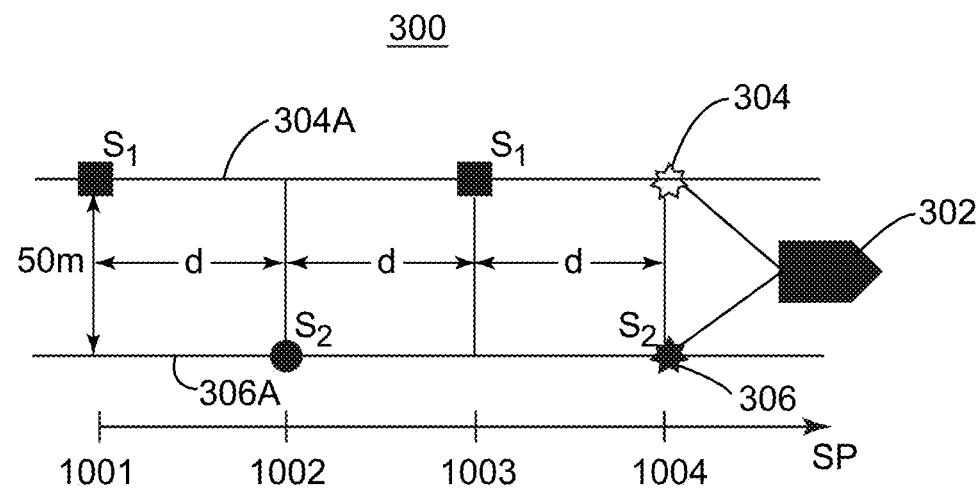
FIGS. 3A-B are graphical illustrations of a traditional seismic acquisition system.
Figure 3B:
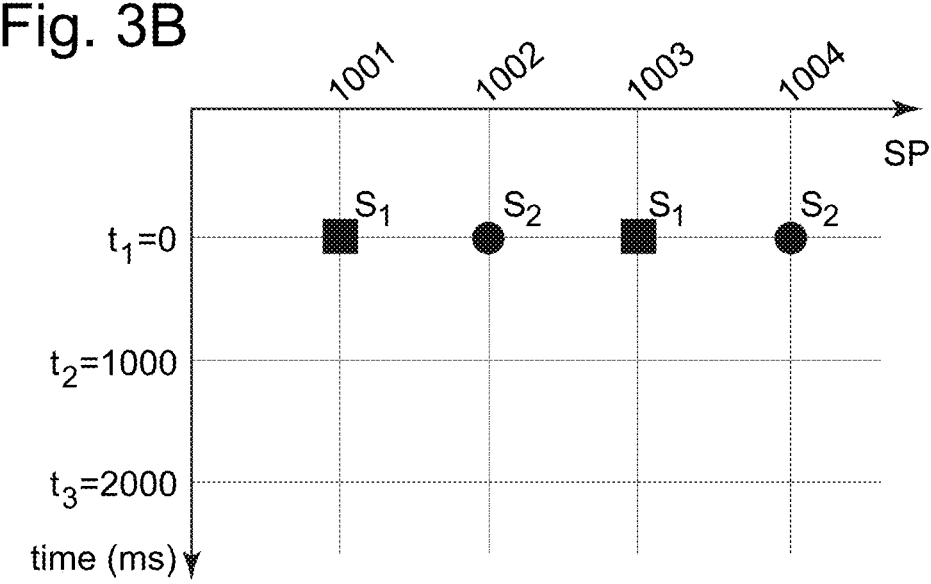
Figure 4A:
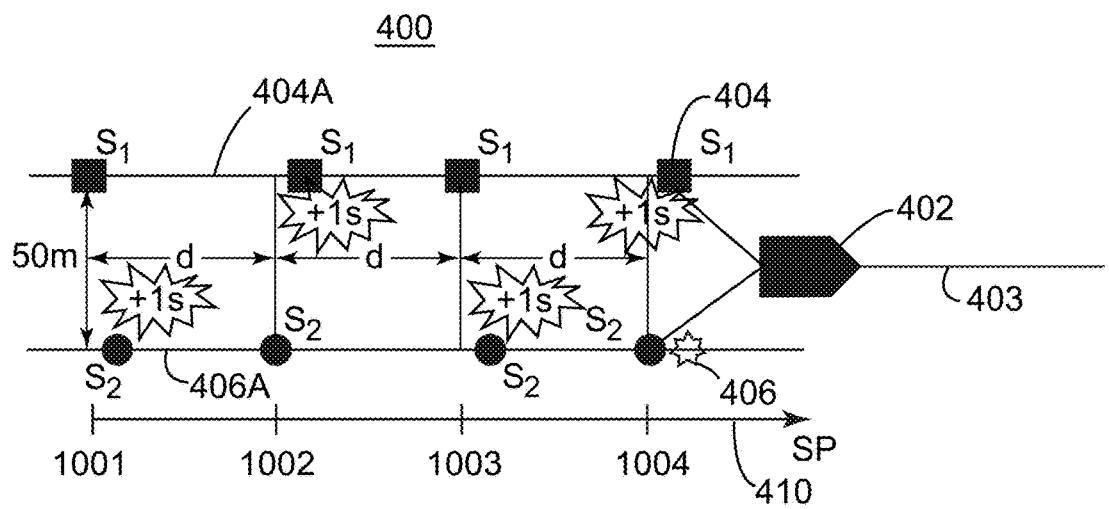
FIGS. 4A-B illustrate a seismic acquisition system configured to acquire blended seismic data.
Figure 4B:
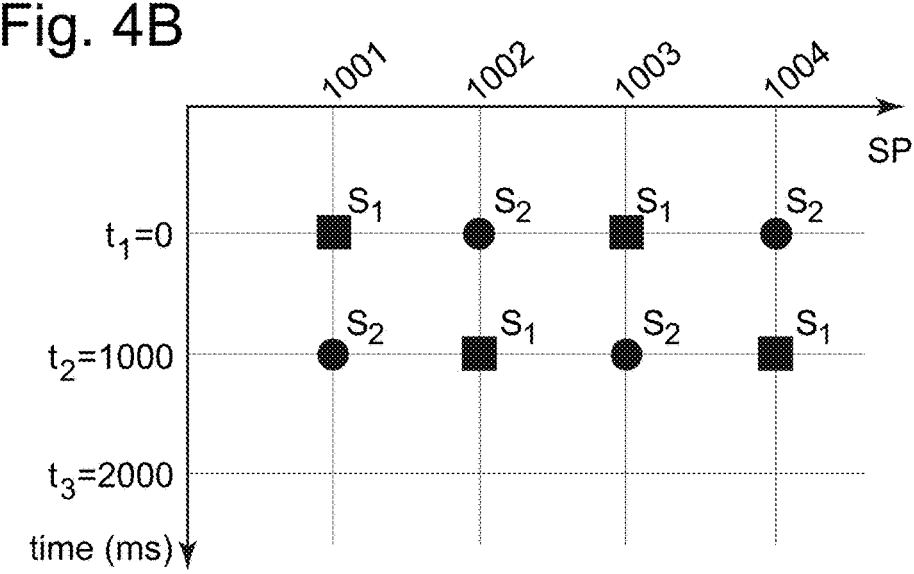

According to an embodiment illustrated in FIGS. 4A-B, a seismic survey system 400 includes a vessel 402 that tows two seismic source arrays 404 and 406. Vessel 402 follows a sail line 403, which may be received and stored on a controller aboard the vessel. Sail line 403 may be calculated prior to the seismic survey. The sail line is associated with shot point locations 1001 to 1004 (only four shot point locations are shown in the figure for simplicity) where, traditionally, source arrays are supposed to be shot. Source arrays 404 and 406 are fired simultaneously with a time delay TD of 1 s in this example. Please note that another time delay may be used, e.g., any time longer than zero and shorter than 10 s. Other time delays may be used, depending on the characteristics of the survey. In one application, a jitter time (e.g., random time) may be added in addition to the time delay. The jitter time may be positive or negative, may be added for each delayed source array or only for a set of the source arrays. A value of the jitter time may be selected to be less than a value of the time delay. In one application, the jitter time is less than 100 ms. Source arrays 404 and 406 follow corresponding source paths 404A and 406A, which may be separated by a distance of 50 m. However, another value for this distance may be used. FIG. 4A shows a shot point (SP) axis 410 that illustrates four shot point positions 1001 to 1004. The shot point positions are calculated prior to acquiring seismic data, and the operator of the seismic survey is supposed to actuate the source arrays at these positions.

However, according to this embodiment, source array 404 is actuated at shot position 1001 (indicated by S1), but source array 406 is actuated at a delayed position indicated by S2. The time delay TD between shot 1001 and shot location S2 of source array 406 is in this example 1s, as is also indicated in FIG. 4B, which is a temporal view of the present acquisition scheme. Note that source array 406 may be actuated with a time delay relative to source 404 or after a given distance after the source array 404 has been activated. In one application, if the speed of the vessel is constant, the time delay is equivalent to the given distance. However, if the vessel's speed is not constant or various currents are present that push the source arrays, it is possible that the time delay is not appropriate for controlling the source arrays. In these circumstances, the notion of distance delay may be used for coordinating the source shooting. Those skilled in the art would understand that a time delay in this application also covers the concept of activating a first source at a given position and activating a second source with a distance delay, i.e., either after the given position or prior to the given position with the distance delay. This time/distance delay (the term delay parameter may be used herein to include a time delay, or a distance delay, or a combination of both) is considered to be applicable to all embodiments described in this application. For this reason, although the specification describes various examples of seismic acquisition using time delays, the same examples may be discussed in terms of distance delays. Thus, the statements made herein about the time delay are also valid for the distance delay. After the vessel advances with the shot point interval d (i.e., the distance between two consecutive shot points), source array 406 is shot at shot point location 1002 as indicated by S2, while source array 404 is shot later in time, i.e., at S1. This pattern is then repeated along source paths 404A and 406A, with one source array shooting at the pre-determined shot point location and the other source array being delayed with a given time relative to the shot point location until the preplot line (or sail line) is finalized. Note that the term "along" used to qualify the source paths is used herein to mean "on" or "in parallel" to the source paths. In one application, time delay TD is only positive. In another application, time delay TD is only negative. In still another application, time delay TD is sometimes positive and sometime negative. Further, in yet another application, time delay TD may vary from shot point to shot point and/or from sail line to sail line. Those skilled in the art would recognize that the configuration of FIGS. 4A-B achieves for each shot point location at least a trace with an initial portion free of contamination from the other source arrays. Note that various corrections may be applied to the source array's actuation timings and/or positions depending on the actual positions of the source arrays relative to a pre-plot, e.g., taking into consideration the crab angle, feather mode, etc.

Figure 5A:
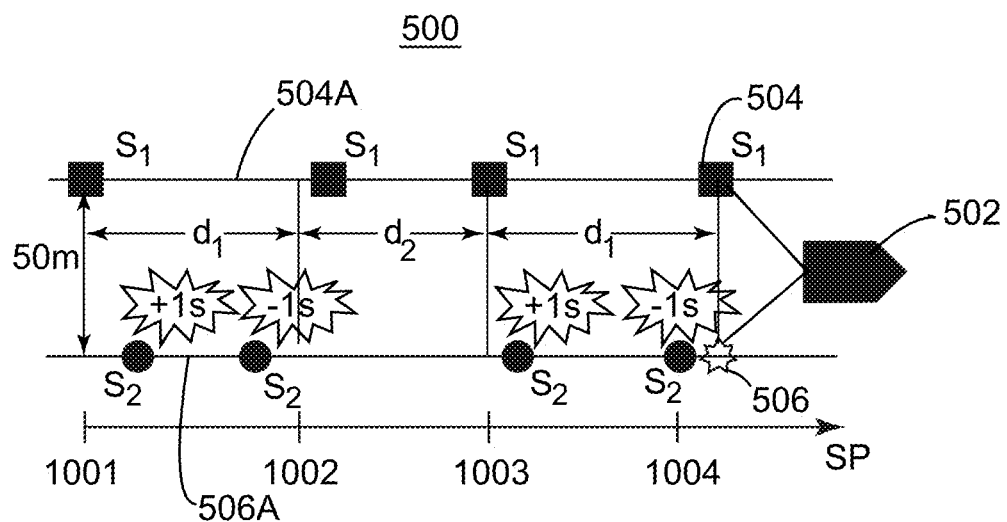
FIGS. 5A-B illustrate another seismic acquisition system configured to acquire blended seismic data.
Figure 5B:
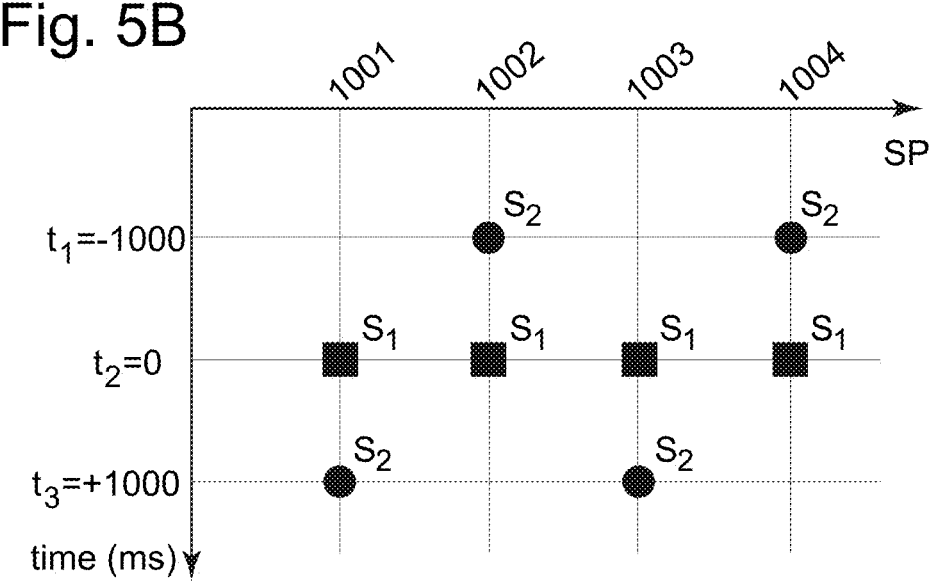

According to another embodiment illustrated in FIGS. 5A-B, one source array is shot at each shot point location, and the other source array is shot with a time delay TD for each shot point location, with the TD changing its sign during the survey. For example, FIG. 5A shows a system 500 in which source array 504 is shot at all shot point locations 1001 to 1004 (four shot point locations are illustrated for simplicity, but it is known that an actual seismic survey has thousands of shot point locations), while source array 506 is shot earlier or later than the shot point locations. FIG. 5B shows the time distribution of the shots when a constant time delay TD of 1 s is used. As in the previous embodiments, time delay TD may take different values and/or have different signs from shot to shot. In all the embodiments discussed herein, the source vessel may also tow a streamer spread including one or more streamers.

While FIG. 5A shows the shot point interval d having different values, i.e., d1 and d2 from shot point to shot point, it is also possible that a constant shot point interval value is used during the seismic survey. In one application, the shot point interval may vary along the sail line, or it may change from sail line to sail line. Those skilled in the art would understand that instead of shooting source array 504 at the predetermined shot point locations 1001 to 1004, it is possible to shoot the other source array 506 at those predetermined shot point locations and to time delay the shooting of source array 504.

Figure 6A:
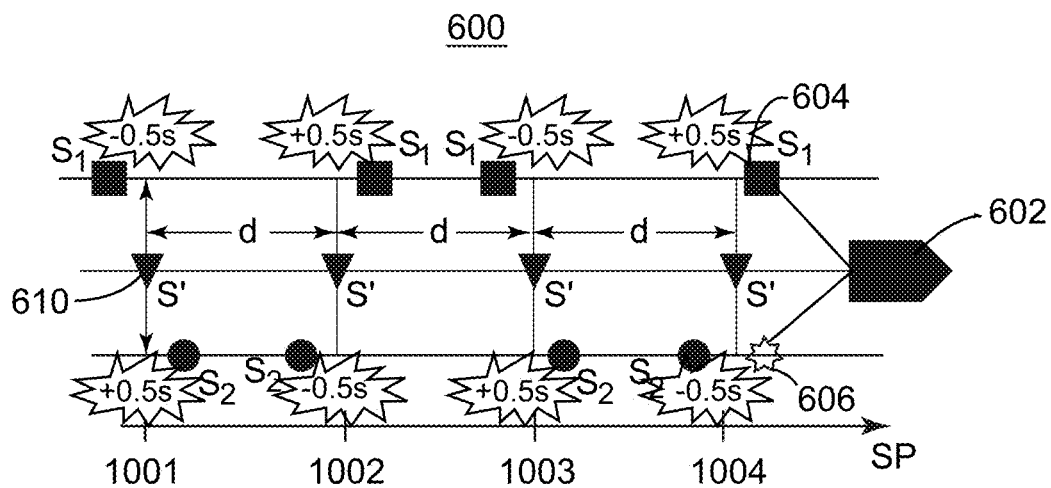
FIGS. 6A-B illustrate yet another seismic acquisition system configured to acquire blended seismic data.
Figure 6B:
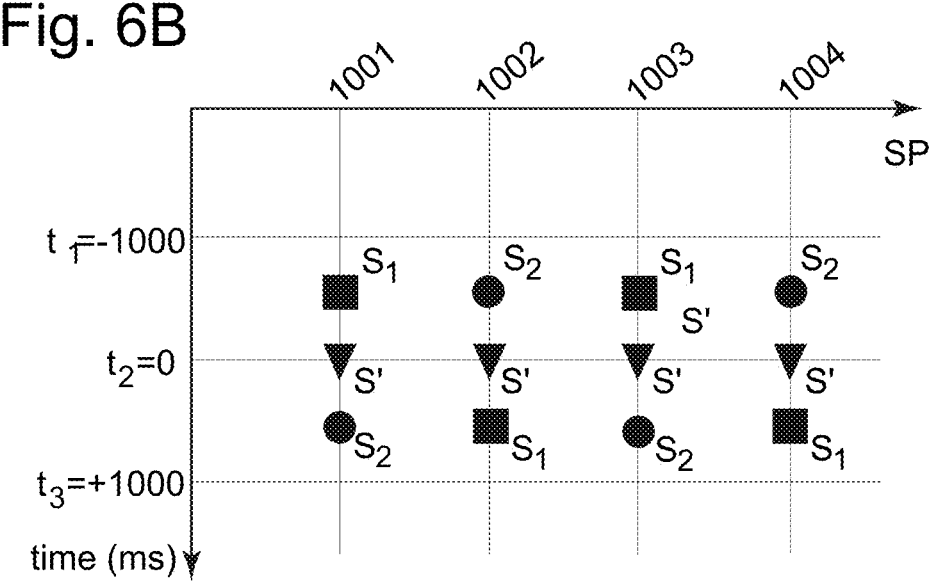

According to still another embodiment illustrated in FIGS. 6A-B, it is possible to delay both source arrays relative to the predetermined shot point locations. More specifically, as illustrated in FIG. 6A, acquisition system 600 includes a vessel 602 towing source arrays 604 and 606. A virtual point 610, illustrated as point S' in the figure, is determined for source arrays 604 and 606, for example, a geometrical middle point between the physical locations of the two source arrays. Other methods may be used to determine virtual point S'.

Seismic system 600 determines when virtual point S' would be aligned with shot point locations 1001 to 1004 and shoots one source array 604 or 606 before that instant and the other source array after that instant with corresponding time delays TD1 and TD2 so that neither source array shoots exactly at shot point locations 1001 to 1004. Time delays for the source arrays may be the same, e.g., TD1=TD2=0.5 s in this example. However, other time delays may be used, for example, 0.3 s for the source array firing before the shot point location and 0.7 s for the source array firing after the shot point location. The time delays are illustrated in FIG. 6B. As in previous embodiments, the shot point interval d may vary from shot point to shot point or from sail line to sail line, and the time intervals may vary as noted in those embodiments.

Figure 7A:
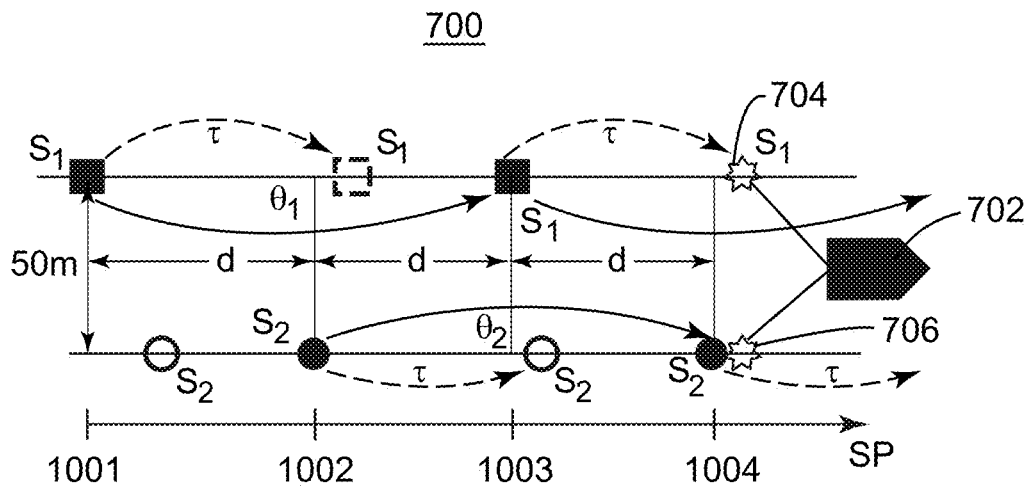
FIGS. 7A-B illustrate still another seismic acquisition system configured to acquire blended seismic data.
Figure 7B:
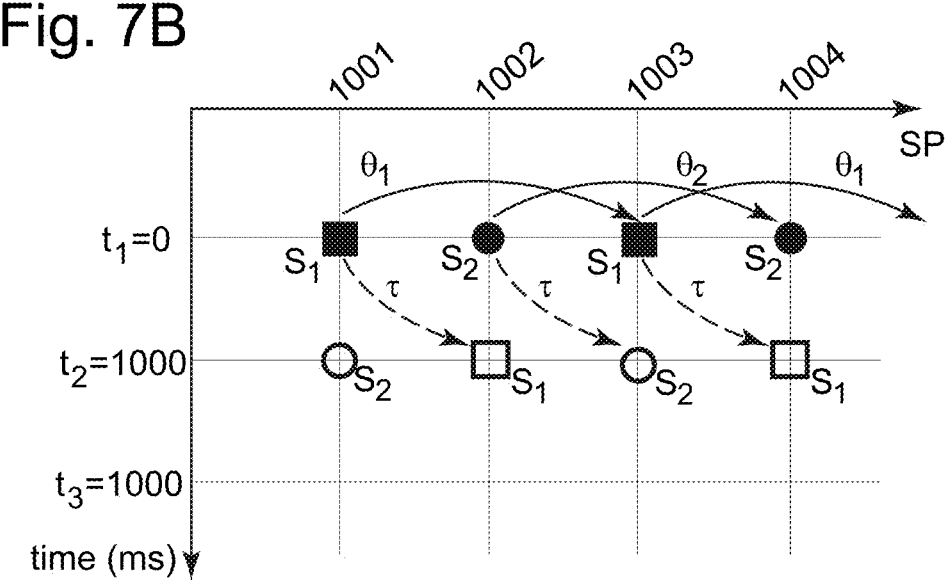

According to still another embodiment illustrated in FIGS. 7A-B, a system 700 that includes source arrays 704 and 706 is configured to shoot source array 704 at given odd shot point locations 1001, 1003, etc., and source array 706 at given even shot point locations 1002, 1004, etc. When source array 704 is shot at odd shot point location 1003, the other source array 706 is shot with a given time offset, e.g., $\tau$s, after source array 706 has been previously shot at shot point location 1002. For the next shot point 1004, source array 706 is shot at shot point location 1004 while source array 704 is shot with the given time offset $\tau$ relative to its previous shot at location 1003. This pattern is then repeated for the entire sail line.

In other words, as illustrated in FIG. 7A, one source array shoots every odd shot point location and shoots with a time offset $\tau$ for the even shot point locations while the other source array shoots every even shot point location and shoots with the time offset $\tau$ the odd shot point locations. Note that time offset $\tau$ is measured between two shots of the same source array, while time delay TD in the other embodiments is measured between a shot point location and an actual location where a source array is shot. The temporal view of this shooting scheme is illustrated in FIG. 7B. Note that horizontal axis in FIG. 7B indicates a shot point and not a distance. In one embodiment, the time offset is different for each source array. In one application, the time offset $\tau$ is selected to be half of the computed/forecasted/expected duration for sailing between two successive shot point locations of the same parity, e.g., 1001 and 1003 or 1002 and 1004, plus a time delay TD similar to the previous embodiments, e.g., 1 s. In another application, the time offset $\tau$ is selected to be a fraction F of the expected/computed/forecast duration for sailing between two successive shot point locations having the same parity, e.g., odd or even. In one application, fraction F is larger than ½ and smaller than 2. For this example, the source array activated at the shot point location is triggered about 1 s (or another delay time) before the other source array. Note that instead of using a time delay and a time offset, it is possible to use a distance delay and a distance offset, i.e., to look at the positions at which the source arrays need to be shot and not at their timing. In one application, it is possible to combine the time delay and time offset with the distance delay and distance offset, for example, it is possible to control the source arrays' shooting based on a time delay and time offset, time delay and distance offset, distance delay and time offset or distance delay and distance offset.

Figure 8:
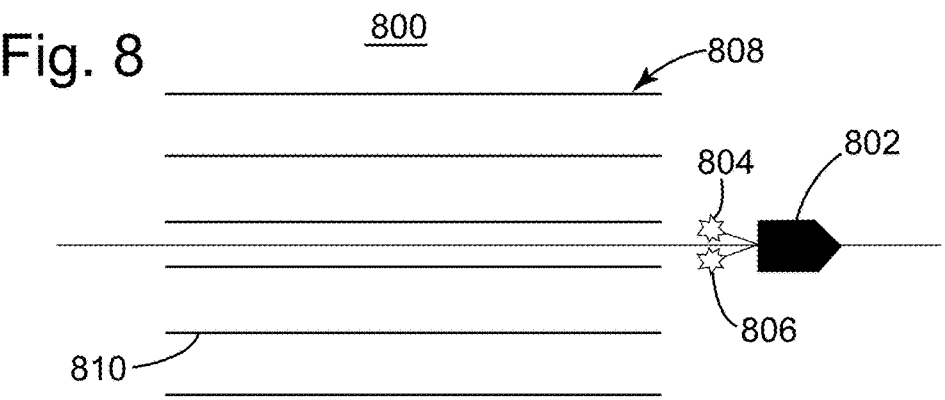
FIGS. 8-10 illustrate various locations of the vessels associated with a seismic acquisition system.
Figure 9:
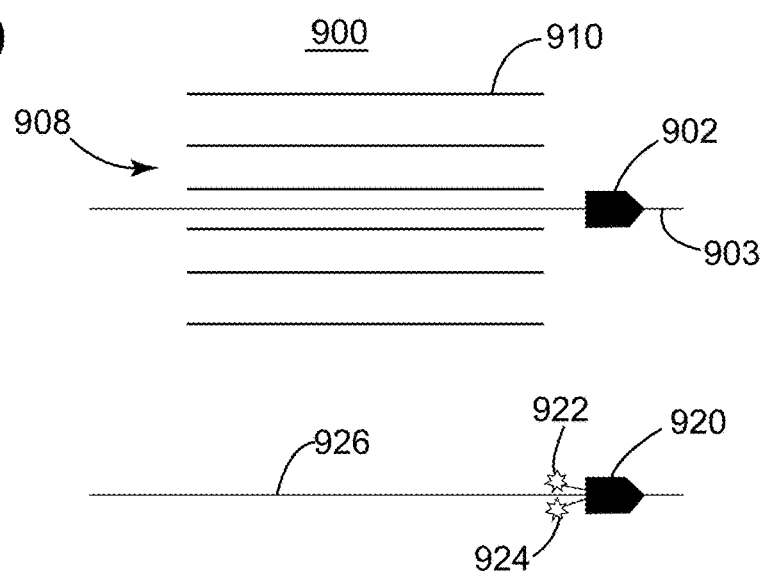
Figure 10:
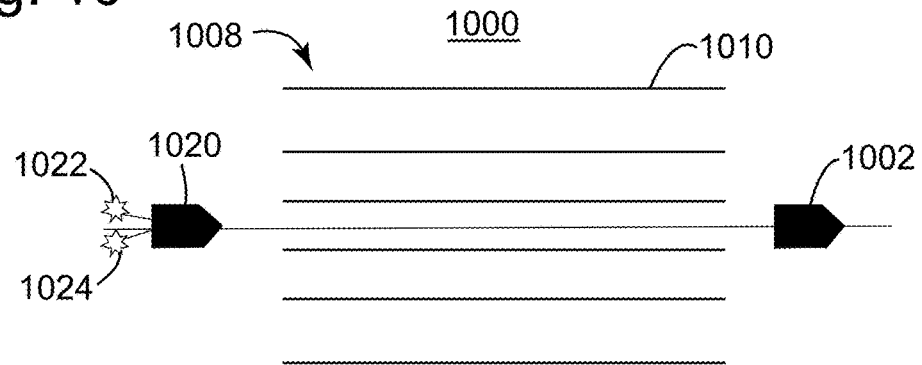

For the above-discussed embodiments, the vessel towing the source arrays may be a source vessel or a streamer vessel, i.e., a vessel that also tows one or more streamers. For example, FIG. 8 shows a possible seismic vessel configuration in which vessel 802 tows source arrays 804 and 806 and also a seismic spread 808 including one or more streamers 810. FIG. 9 shows an example in which streamer vessel 902 tows streamer spread 908 and source vessel 920 tows source arrays 922 and 924. Source vessel 920 may be located ahead, behind or next to the streamers. Source vessel 920 may advance on a sail line 926 substantially parallel to streamer vessel 902's sail line 903 or along the same line, as illustrated in FIG. 10, in which streamer vessel 1002 tows streamer spread 1008 and source vessel 1020 tows source arrays 1022 and 1024. Other variations for the location of the streamer and/or source vessels may be imagined, and also more than one vessel may be used to acquire seismic data. While FIGS. 8 and 10 illustrate a narrow azimuth (NAZ) system and FIG. 9 illustrates a wide azimuth (WAZ) system, it is possible to use a combination of these systems or other systems, e.g., rich azimuth (RAZ) systems for acquiring seismic data.

Figure 11:
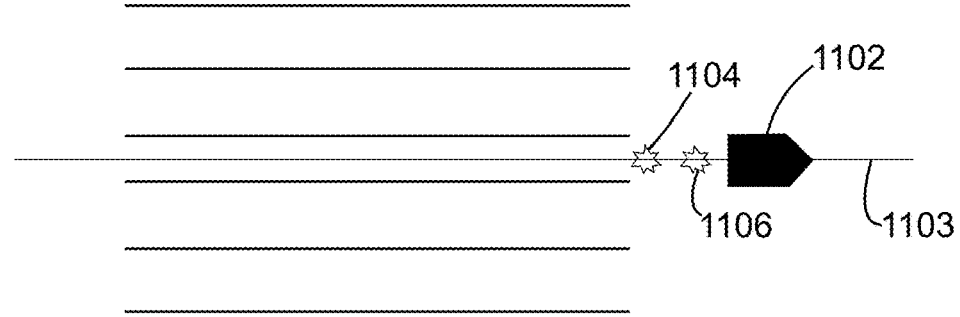
FIGS. 11-13 illustrate seismic acquisition systems configured to tow source arrays along a same line.
Figure 12:
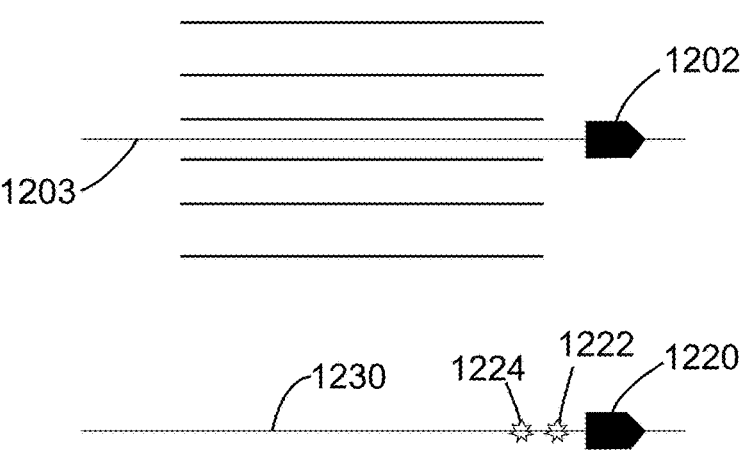
Figure 13:
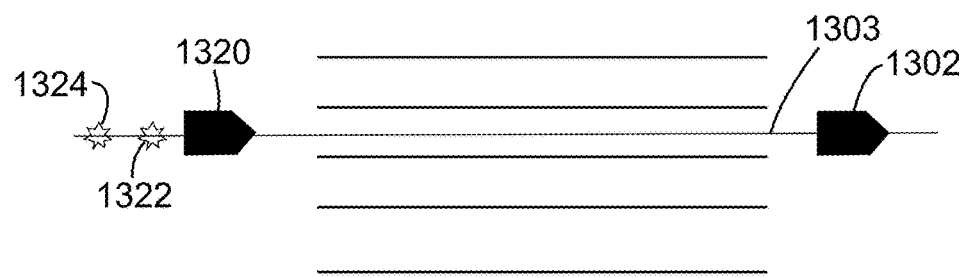

In other embodiments illustrated in FIGS. 11-13, it is possible to mirror the vessel distribution illustrated in FIGS. 8-10 but to tow the source arrays along a same sail line. For example, in FIG. 11 source arrays 1104 and 1106 are towed by streamer vessel 1102 along same sail line 1103; in FIG. 12 source arrays 1222 and 1224 are towed by source vessel 1220 along a sail line 1230, different from streamer vessel 1202's sail line 1203; and in FIG. 13 source vessel 1320 tows sources arrays 1322 and 1324 along the same sail line 1303 as streamer vessel 1302, but offset with a positive or negative distance relative to streamer vessel 1302. What is common in FIGS. 11-13 is the position of the source arrays along a same source line.

Figure 14A:
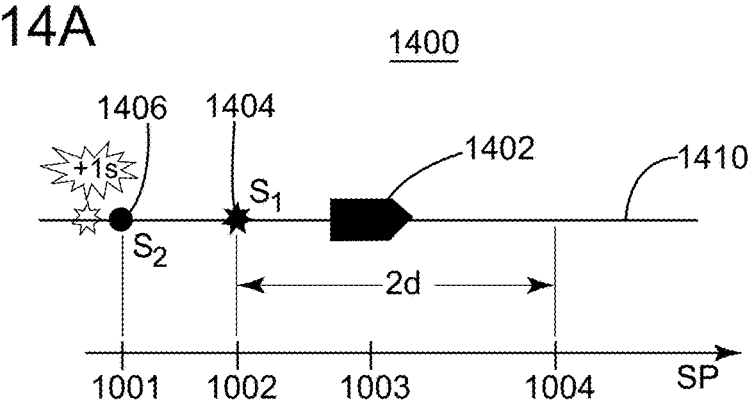
FIGS. 14A-C illustrate a seismic acquisition system configured to acquire blended seismic data with source arrays being towed along a same source line.
Figure 14B:
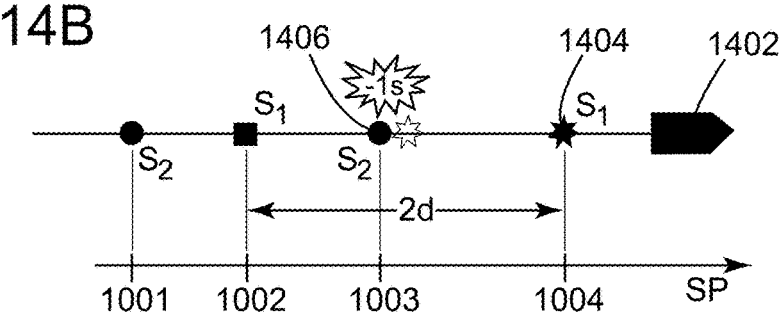
Figure 14C:
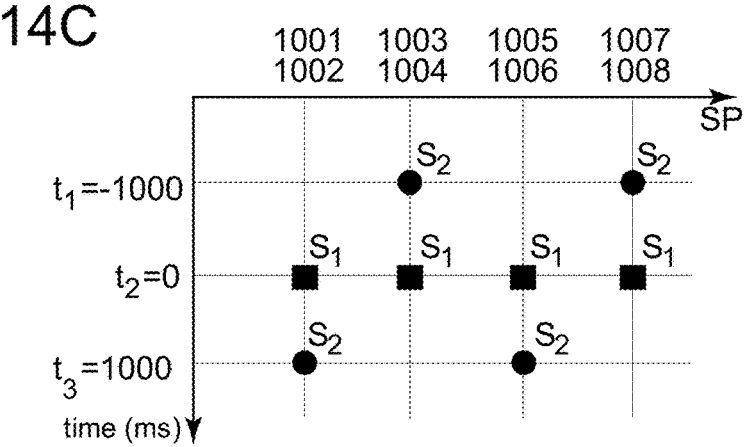

With this source array configuration, a blended seismic data dataset may be acquired as illustrated in FIGS. 14A-C. FIG. 14A shows a system 1400 that includes a vessel 1402 towing two source arrays 1404 and 1406 along a same sail line 1410. Source array 1404 is activated at given shot point location 1002, while source array 1406 is activated prior to or after previous shot point location 1001 with a given time delay TD, e.g., 1 s. In one application, a distance L between source array 1404 and source array 1406 is about distance d, i.e., the shot point interval between two consecutive shot point locations 1001 and 1002. In one application, other configurations are possible, for example, those in which distance L is given by L=(2N+1)d with N≥0.

In other words, source array 1404 is triggered at even shot point intervals 1002 and 1004 as illustrated in FIGS. 14A-B, while the other source array 1406 is activated, alternately, with positive and negative delay (e.g., 1 s) at about the odd shot point intervals 1001 and 1003. The temporal distribution of the shots is illustrated in FIG. 14C. This embodiment allows doubling of the inline source sampling with a shot point interval of about d. The resulting shot point spacing may be irregular. In a variation of this embodiment, source arrays may be activated (with positive or negative delay) when a virtual point associated with the source arrays (e.g., the mid-point of S1 and S2) reaches a predefined source point location, similar to the embodiment illustrated in FIGS. 6A-B.

Figure 15A:
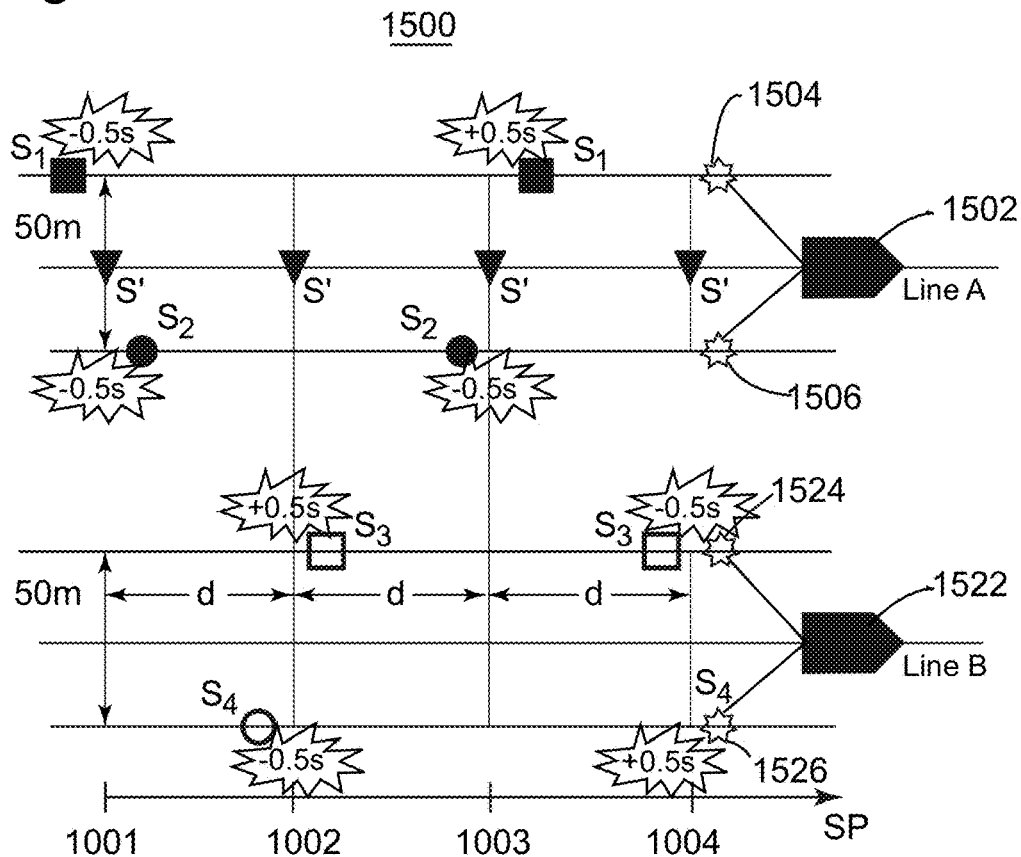
FIGS. 15A-B illustrate a seismic acquisition system configured to acquire blended seismic data with plural source vessels.

The blended acquisition configurations discussed above may be adapted for multi-source vessel acquisition systems as now discussed. In one embodiment illustrated in FIGS. 15A-B, such a multi-source vessel acquisition system 1500 includes first vessel 1502 and second vessel 1522, each towing a pair of source arrays 1504 and 1506, and 1524 and 1526, respectively. The two vessels follow substantially parallel sail lines A and B. Note that it is possible to achieve the same seismic acquisition using a single source configuration instead of the multi-source configuration shown in FIGS. 15A-B. Also note that one or more of the vessels shown in the figures may also tow one or more streamers, but for simplicity, the streamers are not illustrated.

Figure 15B:
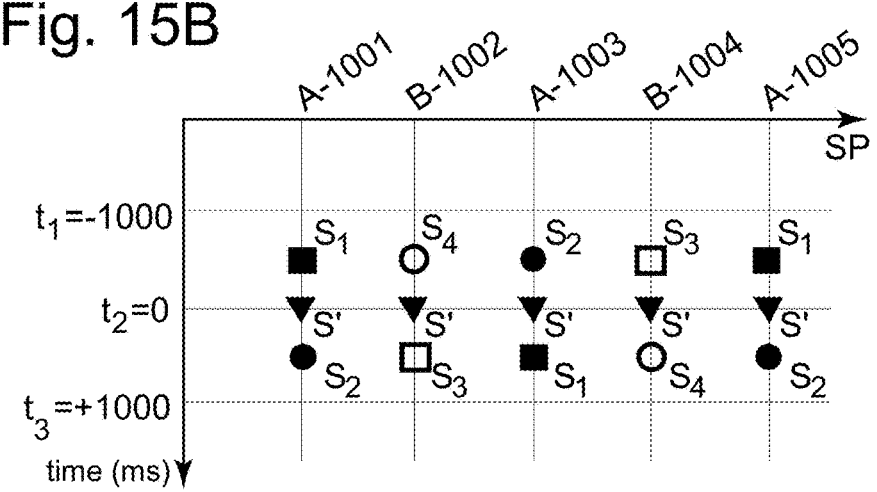

The first pair of source arrays 1504 and 1506 is triggered at positions S1 and S2, with positive and negative time delays relative to a virtual point S' that is located at an odd shot point location 1001. Then, the vessels sail to the next even shot point 1002. When virtual point S' arrives at shot point location 1002, the other pair of source arrays 1524 and 1526 is activated with positive and negative time delay TD relative to shot point location 1002. In this acquisition mode, odd shot point locations are acquired on acquisition line A and even shot point locations are acquired on acquisition line B. Thus, on a given acquisition line, the shot point interval is about 2d. The temporal distribution of the shots from all the sources is illustrated in FIG. 15B.

Figure 16A:
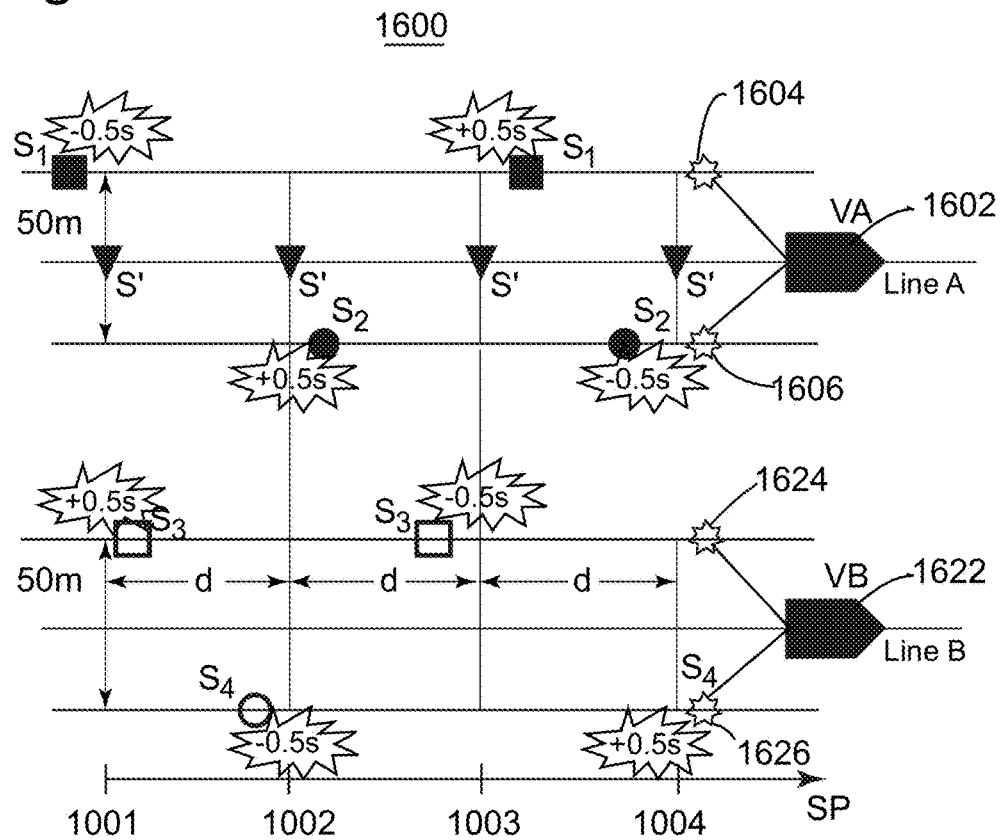
FIGS. 16A-B illustrate another seismic acquisition system configured to acquire blended seismic data with plural source vessels.
Figure 16B:
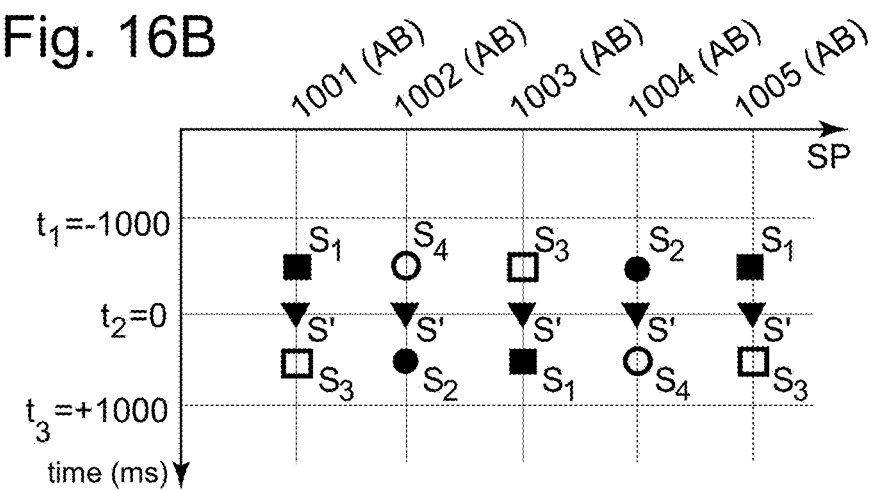

Another embodiment is illustrated in FIGS. 16A-B, in which two source vessels 1602 and 1622 tow corresponding pairs (1604 and 1606, 1624 and 1626) of source arrays. The present acquisition configuration is similar to the previous embodiment, except that another combination of pairs of source arrays is triggered at selected shot point locations, e.g., source arrays {1604, 1624} and source arrays {1606, 1626}. The first pair of source arrays, e.g., {1604, 1624} is activated with positive and negative time delay TD, alternately, when virtual point S' (e.g., the mid-point of S1 and S2) reaches the odd shot point locations. Then, the vessels sail to the next even shot point location, where the second pair of source arrays {1606, 1626} is activated with positive and negative time delay TD, respectively, and alternately. In this acquisition mode, shot point locations are acquired simultaneously on the two lines, A and B, and the shot point interval is about d. The temporal distribution of the shots is illustrated in FIG. 16B.

Figure 17A:
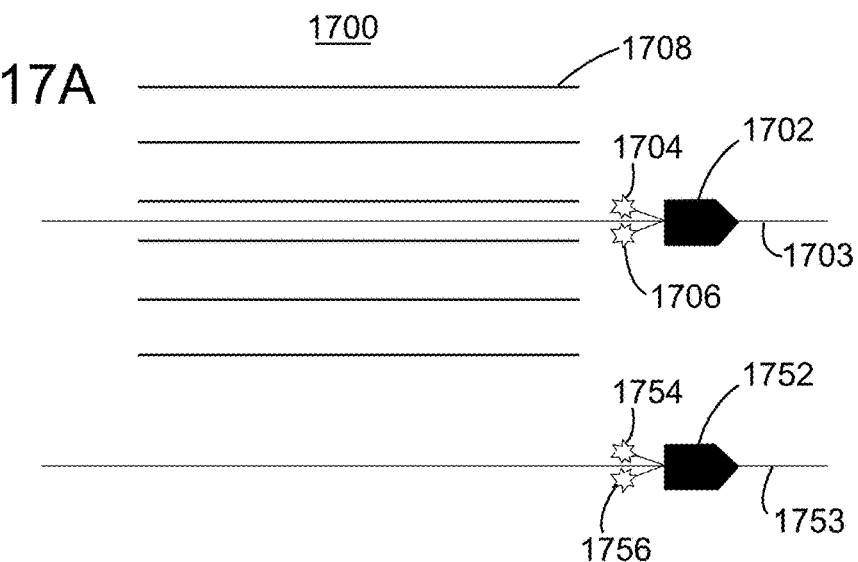
FIGS. 17A-D are schematic diagrams of an entire seismic acquisition system configured to acquire blended seismic data.
Figure 17B:
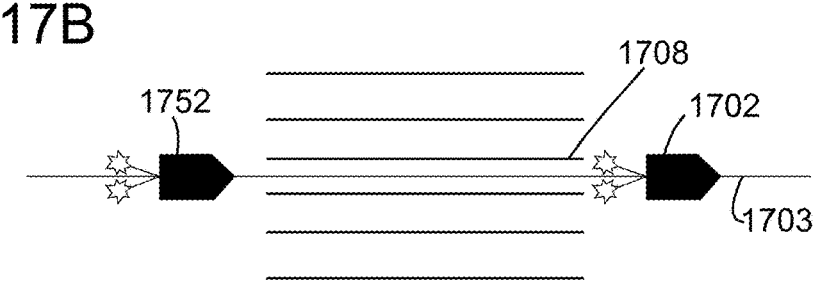
Figure 17C:
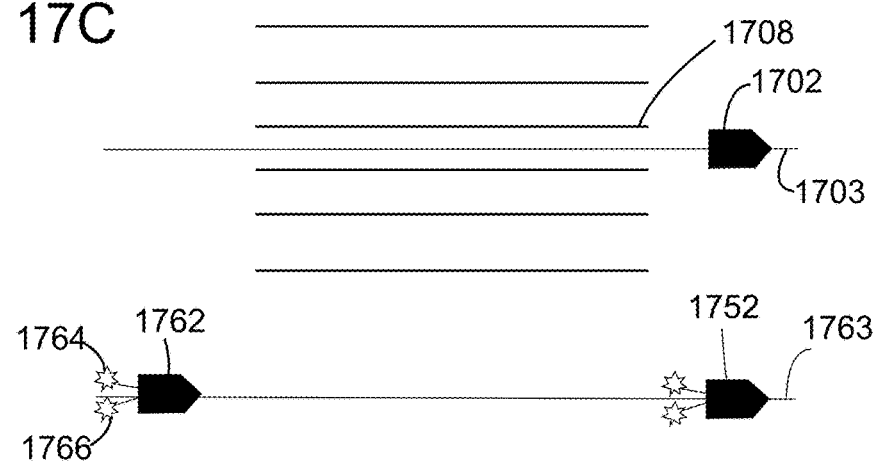

FIGS. 17A-C shows some exemplary multi-vessel configurations that may be used with the embodiments discussed above. For example, acquisition system 1700 may include a first vessel 1702 that tows first and second source arrays 1704 and 1706 and streamer 1708 along a sail line 1703. Note that coordinates of the sail line 1703 (which is the equivalent of a preplot line) are usually received by the vessel prior to performing the data acquisition. A second vessel 1752, towing its own sources 1754 and 1756, may follow a parallel sail line 1753, in front of the streamers 1708, as illustrated in FIG. 17A. The embodiment of FIG. 17B shows the second vessel 1752 following the same sail path 1703, but behind the streamers 1708. The embodiment of FIG. 17C shows second vessel 1752 and third vessel 1762 (having its own source arrays 1764 and 1766) following a common sail line 1763, substantially parallel to the sail line 1703 of the first vessel 1702. Other source vessel configurations may be used as would be recognized by those skilled in the art.

Figure 17D:
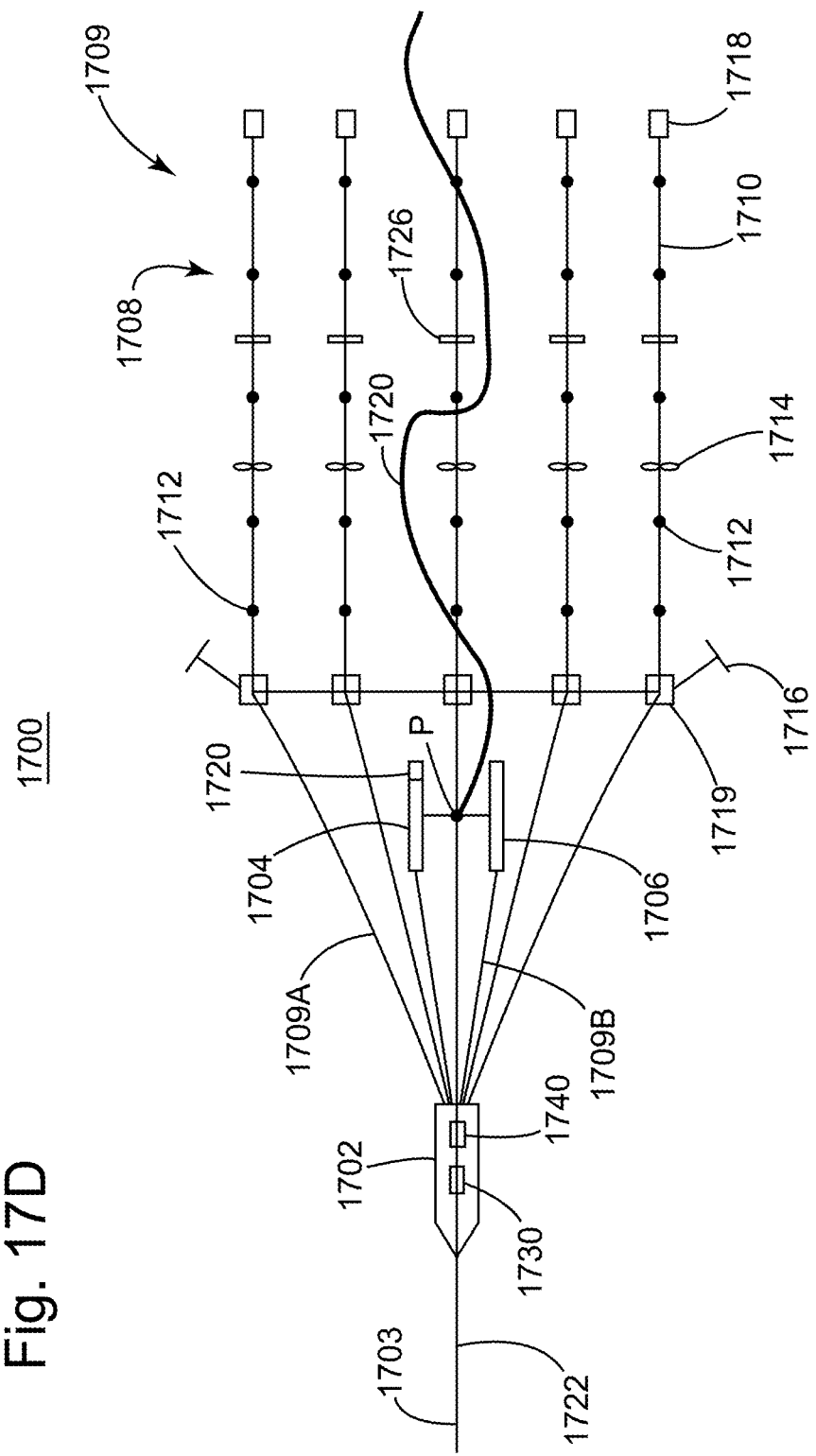

FIG. 17D shows in more detail the acquisition system 1700 that may be used with one or more of the above embodiments. Seismic acquisition system 1700 may include a vessel 1702 that tows two source arrays 1704 and 1706 and a plurality of streamers 1708. Vessel 1702 has a predetermined path 1703 to follow during the seismic survey. Each source array may include a float from which individual elements (e.g., air guns or marine vibrators) are suspended at a given depth in water. The individual elements may be distributed along a horizontal line, a slanted line, or a curved line (e.g., a multi-level source array). A distance between each source element and the float may be dynamically adjusted during the seismic survey. Each float may be provided with a global positioning system (GPS) for obtaining an accurate location of the source arrays.

One or more streamers 1710 belonging to the plurality of streamers 1708 extends for miles behind the vessel. The streamer may be a fluid-filled streamer or a solid streamer, such as those manufactured by Sercel, France. The streamer includes various components, one of them being a seismic sensor or receiver. The seismic sensor may be one of a hydrophone, a geophone, an accelerometer, a pressure gradient, a particle vector data, or any combination therein. The sensor may be single-component or multicomponent. A single-component sensor is, for example, a hydrophone because it records only a single quantity (pressure) associated with the seismic data. A multicomponent sensor records a vector quantity (e.g., displacement, velocity, acceleration) associated with the seismic data. Combinations of these sensors may also be used, for example, having single- and multicomponent sensors collocated in the streamer, having single- or multicomponent sensors distributed in a transversal plane inside the streamer, etc. In one application, the streamer includes plural sections, with some sections including single-component seismic receivers and other sections including multicomponent seismic receivers. These sections may be alternately located along the streamer or only at certain locations.

For positioning the streamer, one or more control devices may be used. An example of such a control device is a bird 1714 that may be controlled to move laterally and/or vertically to adjust a shape or position of the streamer. One or more paravanes may be provided at a head portion of the streamers and may be used to separate the streamers in the spread 1709 from each other so they do not tangle. Note that spread 1709 may include not only streamers 1708 and associated equipment (e.g., receivers, buoys, floats, birds, etc.) but also seismic sources and lead-ins 1709A and 17098 that connect the source arrays and the streamers to the vessel. Tail buoys 1718 and head floats 1719 may be attached to the streamers' ends to maintain their depth. Also, the buoys and floats may have GPS devices that offer accurate locations for the streamers' ends. When used together with a ranging system 1726, which is schematically illustrated in FIG. 17D, an accurate position of the entire streamer may be determined by direct measurements. Note that ranging system 1726 includes pingers and transmitters distributed along the streamers and configured to "talk" to each other to determine distances between adjacent streamers. In one embodiment, control device 1730 controls the actuation of each source array.

Vessel 1702 is provided with one or more control devices 1730 configured to communicate (receive data and send commands) with the elements discussed above with regard to FIG. 17D. For example, control device 1730 may instruct birds 1714 to change a depth of the streamers, or may control when the source elements need to be shot, or may receive seismic data from the sensors 1712. While FIG. 17D shows a schematic control device 1730, those skilled in the art would recognize that control device 1730 may include many software and hardware components. For example, control device may include a seismic module, a steering module, an automatic pilot module 1740, etc. Control device 1730 may also receive information regarding environmental conditions, for example, current speed, wind speed, water temperature, salinity, etc.

Control device 1730 may also communicate with the vessel's propulsion system to steer the vessel according to a pre-plot or with a target path. The pre-plot may be calculated in a land facility and then downloaded to the control device, or it may be calculated directly within the control device. Control device 1730 may also include a module that allows the vessel's operator to input data and/or commands. For example, control device 1730 may store a cable model that describes the elements indicated in FIG. 17D. In this way, a force or angle or displacement applied on or generated by any element of system 1700 may be calculated, modified or measured. This module may be helpful in selecting the virtual point and monitoring its path during the seismic survey. Also, the module may determine (plot) virtual point P's path 1720 at any moment and can also receive the vessel's path 1702. Virtual point P's path 1720 may differ from its pre-plot 1722, which in this case happens to coincide with the vessel's pre-determined path 1703.

Other types of data may be used by control device 1730 to determine correct actuation of source arrays. For example, historic data associated with a given subsurface and acquired earlier in time from other seismic surveys may be used, for example, to identify the direction of the currents for each location of the streamer. In one application, various sensors (acoustic sensors) are installed on the vessel's hull to position the streamers or the sources. This data may also be used by control device 1730. Oceanographic data is another example of additional data that may be obtained from specialized providers. Oceanographic data may be useful when shooting source arrays.

Figure 18:
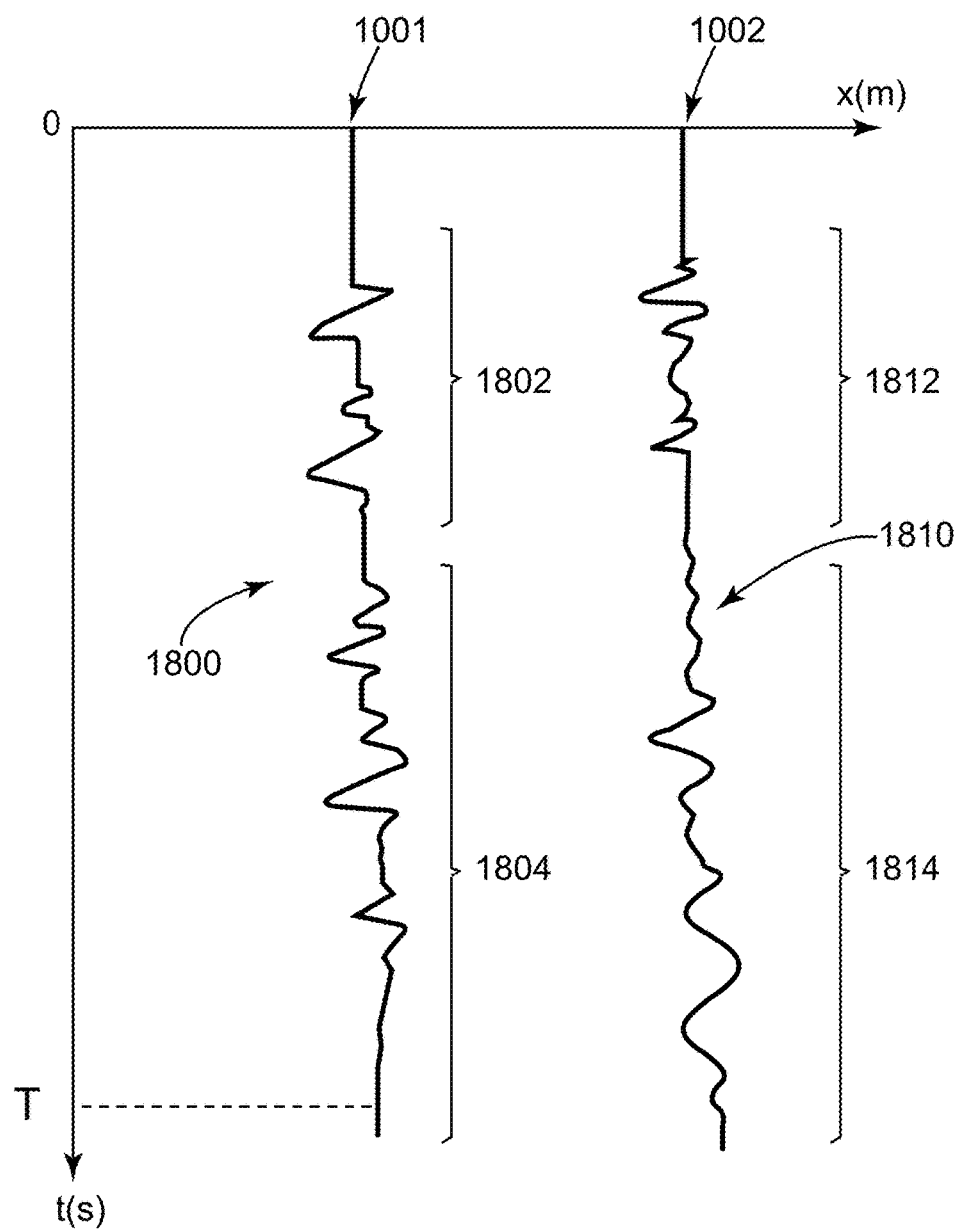
FIG. 18 schematically illustrates two traces recorded with one of the above-noted systems.

A feature that is desired to be achieved with one or more of the embodiments discussed above is illustrated in FIG. 18, in which a synthetic trace 1800 is shown at a given shot point location 1001 extending over a certain time interval T. Because one source array shoots ahead of all the other source arrays for that shot point location, a first portion 1802 of trace 1800 includes seismic energy generated by the source array that shoots first, and a second portion 1804 of trace 1800 includes seismic energy from all other source arrays that are shot. In one application, first portion 1802 extends for substantially TD seconds. A next trace 1810 also includes a first portion 1812 and a second portion 1814. The first portion includes seismic energy from a single source array, different from the source array associated with first portion 1802 of trace 1800, and the second portion 1814 includes energy from all other source arrays.

Figure 19:
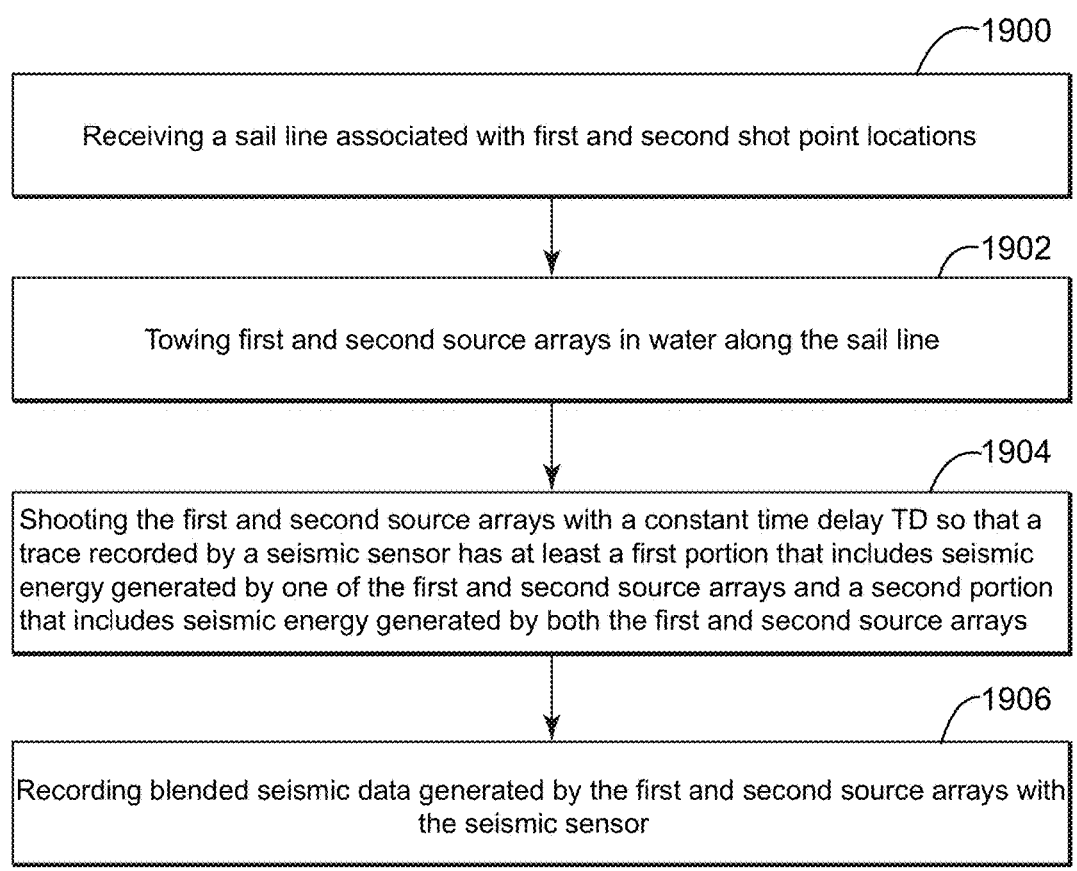
FIG. 19 is a flowchart of a method for acquiring blended seismic data.

A method for acquiring blended seismic data associated with a subsurface of the earth, based on one of the above embodiments, is now discussed with regard to FIG. 19. The method includes a step 1900 of receiving a sail line associated with first and second shot point locations, a step 1902 of towing first and second source arrays in water along the sail line, a step 1904 of shooting the first and second source arrays with a constant time delay TD so that a trace recorded by a seismic sensor has at least a first portion that includes seismic energy generated by one of the first and second source arrays and a second portion that includes seismic energy generated by both the first and second source arrays, and a step 1906 of recording blended seismic data generated by the first and second source arrays with the seismic sensor. The locations of the source arrays when shooting may be selected based on any of the above-discussed embodiments.

Figure 20:
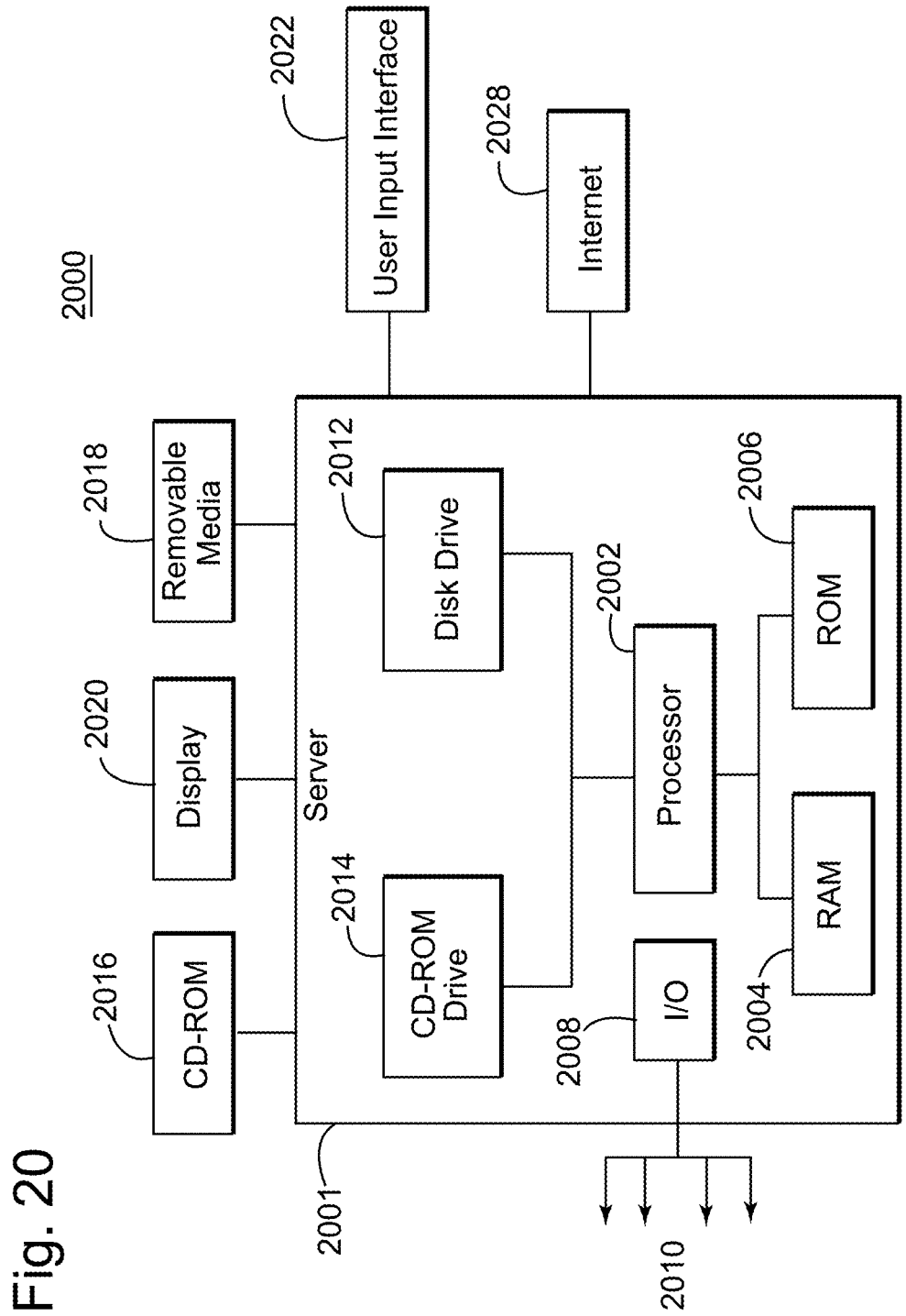
FIG. 20 is a schematic diagram of a control system configured to perform one or more of the above-discussed methods.

The above method and others may be implemented in a control system specifically configured to shoot the source arrays. An example of a representative control system capable of carrying out operations in accordance with the exemplary embodiments is illustrated in FIG. 20. Hardware, firmware, software or a combination thereof may be used to perform the various steps and operations described herein.

The exemplary control system 2000 suitable for performing the activities described in the exemplary embodiments may include a server 2001. Such a server 2001 may include a central processor (CPU) 2002 coupled to a random access memory (RAM) 2004 and to a read-only memory (ROM) 2006. ROM 2006 may also be other types of storage media to store programs, such as programmable ROM (PROM), erasable PROM (EPROM), etc. Processor 2002 may communicate with other internal and external components through input/output (I/O) circuitry 2008 and bussing 2010, to provide control signals and the like. Processor 2002 carries out a variety of functions as are known in the art, as dictated by software and/or firmware instructions.

Server 2001 may also include one or more data storage devices, including a disk drive 2012, CD-ROM drives 2014, and other hardware capable of reading and/or storing information such as DVD, etc. In one embodiment, software for carrying out the above-discussed steps may be stored and distributed on a CD- or DVD-ROM 2016, removable memory device 2018 or other form of media capable of portably storing information. Server 2001 may be coupled to a display 2020, which may be any type of known display. A user input interface 2022 is provided, including one or more user interface mechanisms such as a mouse, keyboard, microphone, touchpad, touch screen, voice-recognition system, etc.

Server 2001 may be coupled to other computing devices, such as landline and/or wireless terminals, via a network. The server may be part of a larger network configuration as in a global area network (GAN) such as the Internet 2028. The computing device may be implemented on a vessel that performs a marine seismic survey.

The disclosed exemplary embodiments provide a system and a method for acquiring blended seismic data. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for acquiring partially blended seismic data associated with a subsurface of the earth, the method comprising:
   receiving coordinates of a sail line and plural shot point locations along the sail line;
   towing first and second source arrays in water along the sail line, wherein the first source array includes plural first individual source elements that are shot in their entirety and simultaneously and the second source array includes plural second individual source elements that are shot in their entirety and simultaneously, wherein the first and second source arrays are separated along a cross-line distance that is perpendicular to the sail line;
   for each shot point location among the plural shot point locations, shooting one of the first and second source arrays at the shot point location, and shooting other one of the first and second source arrays with a constant shift before or after the shot point location; and
   recording a seismic trace by a seismic sensor, the seismic trace having (i) a first portion of unblended data that includes seismic energy generated substantially by only one of the first and second source arrays and (ii) a second portion of blended data that includes seismic energy generated by both the first and second source arrays.

2. The method of claim 1, wherein the constant shift is a time delay TD, or a distance delay.

3. The method of claim 1, wherein the constant shift is a time delay TD and a time length of the first portion is substantially equal to the time delay TD.

4. The method of claim 1, wherein the constant shift is a time delay TD and an absolute value of the time delay TD is equal to or larger than 0.5 s and smaller than 10 s.

5. The method of claim 1, wherein the constant shift is a time delay TD and the time delay TD is substantially equal to 1 s.

6. The method of claim 1, further comprising:
   shooting the first source array at each shot point locations; and
   shooting the second source array prior to or after each of the shot point locations.

7. The method of claim 1, further comprising:
   alternately shooting
   (i) the first source array without the constant shift and the second source array with the constant shift prior to, or after passing one of the plural shot point locations, and,
   (ii) the second source array without the constant shift and the first source array with the constant shift prior to, or after passing a respective next one of the plural shot point locations.

8. The method of claim 1, wherein a shot point interval between consecutive ones among the plural shot point locations varies.

9. The method of claim 1, wherein
   after shooting one of the first and second source arrays at a first shot location of the plural shot point locations, the one of the first and second source arrays is shot after a time offset τ relative to a time when the one of the first and second source arrays was shot at the first shot point location,
   wherein the time offset τ is longer than a time necessary for the one of the first and second source arrays to travel from the first shot point location to a next second shot point location among the plural shot point locations.

10. The method of claim 1, wherein the first and second source arrays are towed by a same vessel.

11. The method of claim 1, further comprising:
    towing third and fourth source arrays in water along the sail line;
    at each shot point location among second shot point locations intercalated between the plural shot point locations along the sail line, shooting one of the third and fourth source arrays at the each second shot point location; and
    shooting the other one of the third and fourth source arrays, with the constant shift prior to or after passing the each second shot point location,
    wherein the first and second source arrays are towed with a first vessel and the third and fourth source arrays are towed with a second vessel.

12. A method for acquiring partially blended seismic data associated with a subsurface of the earth, the method comprising:
    receiving coordinates of a sail line and first and second shot point locations along the sail line;
    towing first and second source arrays in water along the sail line, wherein the first source array includes plural first individual source elements that are shot in their entirety and simultaneously and the second source array includes plural second individual source elements that are shot in their entirety and simultaneously, wherein the first and second source arrays are separated from each other along a cross-line distance that is perpendicular to the sail line;
    for each first shot point location among the plural first shot point locations, shooting the first and second source arrays with first and second shifts, respectively, relative to the first shot point location;
    for each second shot point location among the plural second shot point locations, shooting the first and second source arrays with the second and first shifts respectively, relative to the second shot point location; and
    recording partially blended seismic data due to the shootings of the first and second source arrays, with seismic receivers placed along a towed steamer.

13. The method of claim 12, wherein the first shift makes one of the first and second source array shooting to occur before the first or the second point location, and the second shift makes another one of the first and second source array shooting to occur after the first or the second point location.

14. A method for acquiring partially blended seismic data associated with a subsurface of the earth, the method comprising:
    receiving information about first and second sail lines (A, B) and first and second shot point locations along the first and the second sail line;
    towing first and second source arrays in water along the first sail line separated from each other by a first cross-line distance that is perpendicular to the first sail line, and third and fourth source arrays following along the second sail line, separated from each other by a second cross-line distance that is perpendicular on the second sail line;
    for each first shot location among the first shot point locations, shooting the first and third source arrays with constant first and second shifts, respectively, relative to the first shot point location;
    for each second shot location among the second shot point locations, shooting the second and fourth source arrays with the constant second and first shifts, respectively, relative to the second shot point location; and recording partially blended seismic data due to the shootings of the first to fourth source arrays with seismic receivers placed along a towed steamer, wherein each of the first to fourth source arrays includes a corresponding plurality of individual source elements that are shot in their entirety and simultaneously.

15. The method of claim 14, wherein the constant first and second shifts are time delays, which are substantially equal to 0.5 s.

* * * * *